United States Patent
Wang et al.

(10) Patent No.: US 11,552,894 B2
(45) Date of Patent: Jan. 10, 2023

(54) METHOD FOR REGULATING TRAFFIC OF TCP FLOW

(71) Applicant: NATIONAL CHIAO TUNG UNIVERSITY, Hsinchu (TW)

(72) Inventors: Shie-Yuan Wang, Hsinchu (TW); Hsien-Wen Hu, Taoyuan (TW); Yi-Bing Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 57 days.

(21) Appl. No.: 17/108,430

(22) Filed: Dec. 1, 2020

(65) Prior Publication Data

US 2022/0021618 A1  Jan. 20, 2022

(30) Foreign Application Priority Data

Jul. 15, 2020  (TW) .................................. 109123851

(51) Int. Cl.
*H04L 29/06* (2006.01)
*H04L 47/215* (2022.01)
(Continued)

(52) U.S. Cl.
CPC .......... *H04L 47/215* (2013.01); *H04L 47/115* (2013.01); *H04L 69/163* (2013.01)

(58) Field of Classification Search
CPC ......... H04L 69/22; H04L 49/90; H04L 49/25; H04L 12/819; H04L 12/801; H04L 29/06; H04L 12/947; H04L 12/861; G16Y 10/75
(Continued)

(56) References Cited

U.S. PATENT DOCUMENTS

| | | | |
|---|---|---|---|
| 6,771,602 B1* | 8/2004 | Benmohamed | H04L 12/5601 370/230.1 |
| 7,085,236 B2* | 8/2006 | Oldak | H04L 47/31 709/233 |

(Continued)

FOREIGN PATENT DOCUMENTS

| | | |
|---|---|---|
| CN | 107623641 A | 1/2018 |
| EP | 1701506 B1 | 10/2012 |
| WO | 2015096692 A1 | 7/2015 |

OTHER PUBLICATIONS

S. Sahu, P. Nain, C. Diot, V. Firoiu, and D. Towsley, "On achievable service differentiation with token bucket marking for tcp," in ACM Sigmetrics Performance Evaluation Review, vol. 28, No. 1. ACM, 2000, pp. 23-33.

(Continued)

*Primary Examiner* — Man U Phan
(74) *Attorney, Agent, or Firm* — Michael Best & Friedrich LLP

(57) ABSTRACT

A method for regulating traffic of a Transmission Control Protocol (TCP) flow includes: deciding, based on a ratio of current bucket level to bucket size, a value of an Explicit Congestion Notification (ECN) bit of a packet; setting a field of a meter tag of the packet based on a packet length of the packet, the value of the ECN bit, and a current bucket level; updating the current bucket level based on the field of the meter tag; calculating an actual transmission rate; and determining an adjustment value based on a difference between the actual transmission rate and a target rate, and adjusting a rate of change of bucket level based on the adjustment value.

9 Claims, 4 Drawing Sheets

(51) Int. Cl.
*H04L 69/163* (2022.01)
*H04L 47/11* (2022.01)

(58) Field of Classification Search
USPC .......................................................... 370/235
See application file for complete search history.

(56) References Cited

U.S. PATENT DOCUMENTS

| | | | | |
|---|---|---|---|---|
| 7,467,223 | B2 | 12/2008 | Wu et al. | |
| 7,643,420 | B2* | 1/2010 | Kwan | H04L 47/10 |
| | | | | 370/235 |
| 7,701,853 | B2 | 4/2010 | Malhotra et al. | |
| 7,817,556 | B2* | 10/2010 | Pan | H04L 47/215 |
| | | | | 370/229 |
| 8,072,886 | B2* | 12/2011 | Kwan | H04L 47/22 |
| | | | | 370/235 |
| 8,743,693 | B2* | 6/2014 | Malhotra | H04L 47/215 |
| | | | | 370/235.1 |
| 9,455,927 | B1* | 9/2016 | Nayak | H04L 47/522 |
| 10,237,875 | B1* | 3/2019 | Romanov | H04L 47/32 |
| 10,674,395 | B2* | 6/2020 | Mukherjee | H04L 47/11 |
| 10,873,533 | B1* | 12/2020 | Ismailsheriff | H04L 47/12 |
| 10,986,021 | B2* | 4/2021 | Schmatz | H04L 47/12 |
| 11,223,568 | B2* | 1/2022 | Li | H04L 47/12 |
| 11,245,632 | B2* | 2/2022 | Matthews | H04L 47/2441 |
| 2019/0280978 | A1 | 9/2019 | Schmatz et al. | |

OTHER PUBLICATIONS

P. P. Tang and T.-Y. Tai, "Network traffic characterization using token bucket model," in IEEE INFOCOM'99. Conference on Computer Communications. Proceedings. Eighteenth Annual Joint Conference of the IEEE Computer and Communications Societies. The Future is Now (Cat. No. 99CH36320), vol. 1. IEEE, 1999, pp. 51-62.

H. Kim, C. Yoo, and W.-Y. Jung, "Simulation study on the effect of the trtcm parameters," in 10th International Conference on Telecommunications, 2003. ICT 2003., vol. 2. IEEE, 2003, pp. 1482-1488.

M. Allalouf and Y. Shavitt, "A simulation study of multi-color marking of tcp aggregates," in 32nd IEEE Conference on Local Computer Networks (LCN 2007). IEEE, 2007, pp. 376-386.

R. van Haalen and R. Malhotra, "Improving tcp performance with bufferless token bucket policing: A tcp friendly policer," in 2007 15th IEEE Workshop on Local & Metropolitan Area Networks. IEEE, 2007, pp. 72-77.

S.Y. Wang, Hsien-Wen Hu, Y.B. Lin, "Design and Implementation of TCP-Friendly Meters in P4 Switches," IEEE/ACM Transactions on Networking, under minor revision, 2020.

Search Report appended to an Office Action, which was issued to Taiwanese counterpart application No. 109123851 by the TIPO dated Jun. 16, 2021, with an English translation thereof (2 pages).

* cited by examiner

METHOD FOR REGULATING TRAFFIC OF TCP FLOW

CROSS-REFERENCE TO RELATED APPLICATION

This application claims priority of Taiwanese Invention Patent Application No. 109123851, filed on Jul. 15, 2020.

FIELD

The disclosure relates to a method for regulating traffic of a network data flow, and more particularly to a method for regulating traffic of a Transmission Control Protocol (TCP) flow.

BACKGROUND

An application specific integrated circuit (ASIC) of a switch includes a meter that is utilized to regulate traffic of a Transmission Control Protocol (TCP) flow in network communication. Conventionally, the meter may drop data packets when network congestion occurs. When a sending terminal receives duplicate acknowledgement (ACK) signals from a receiving terminal or when a timeout event occurs meaning that a certain period has elapsed waiting in vain for an ACK signal from the receiving terminal, the sending terminal determines that network congestion has occurred or that data packets sent thereby were lost, and then reduces the sending rate of data packets. However, the aforesaid congestion control scheme may severely reduce efficiency of transmission of data packets, possibly causing an actual transmission rate to be a mere 10% of an ideal transmission rate, which is specified by a network service contract.

SUMMARY

Therefore, an object of the disclosure is to provide a method for regulating traffic of a Transmission Control Protocol (TCP) flow that can alleviate at least one of the drawbacks of the prior art.

According to the disclosure, the method is to be implemented by a switch. The method includes steps of:
a) receiving an incoming TCP packet;
b) deciding, based on a ratio of current bucket level to bucket size of a token bucket, a logical value of an Explicit Congestion Notification (ECN) bit of the incoming TCP packet;
c) setting a field of a meter tag of the incoming TCP packet based on a packet length of the incoming TCP packet, the logical value of the ECN bit of the incoming TCP packet, and a current bucket level of the token bucket;
d) updating the current bucket level of the token bucket based on the field of the meter tag of the incoming TCP packet thus set, and increasing, for every preset period, the current bucket level of the token bucket by a preset increment;
e) calculating an actual transmission rate at which the incoming TCP packet, the field of the meter tag of which is set to indicate packet forwarding, is to be transmitted; and
f) determining, based on a difference between the actual transmission rate and a target rate, an adjustment value for a rate of change of bucket level, and adjusting the rate of change of bucket level based on the adjustment value such that the actual transmission rate approaches the target rate.

An article "Design and Implementation of TCP-Friendly Meters in P4 Switches" authored by the inventors of this disclosure is published on the website of IEEE/ACM Transactions on Networking on Jul. 1, 2020.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
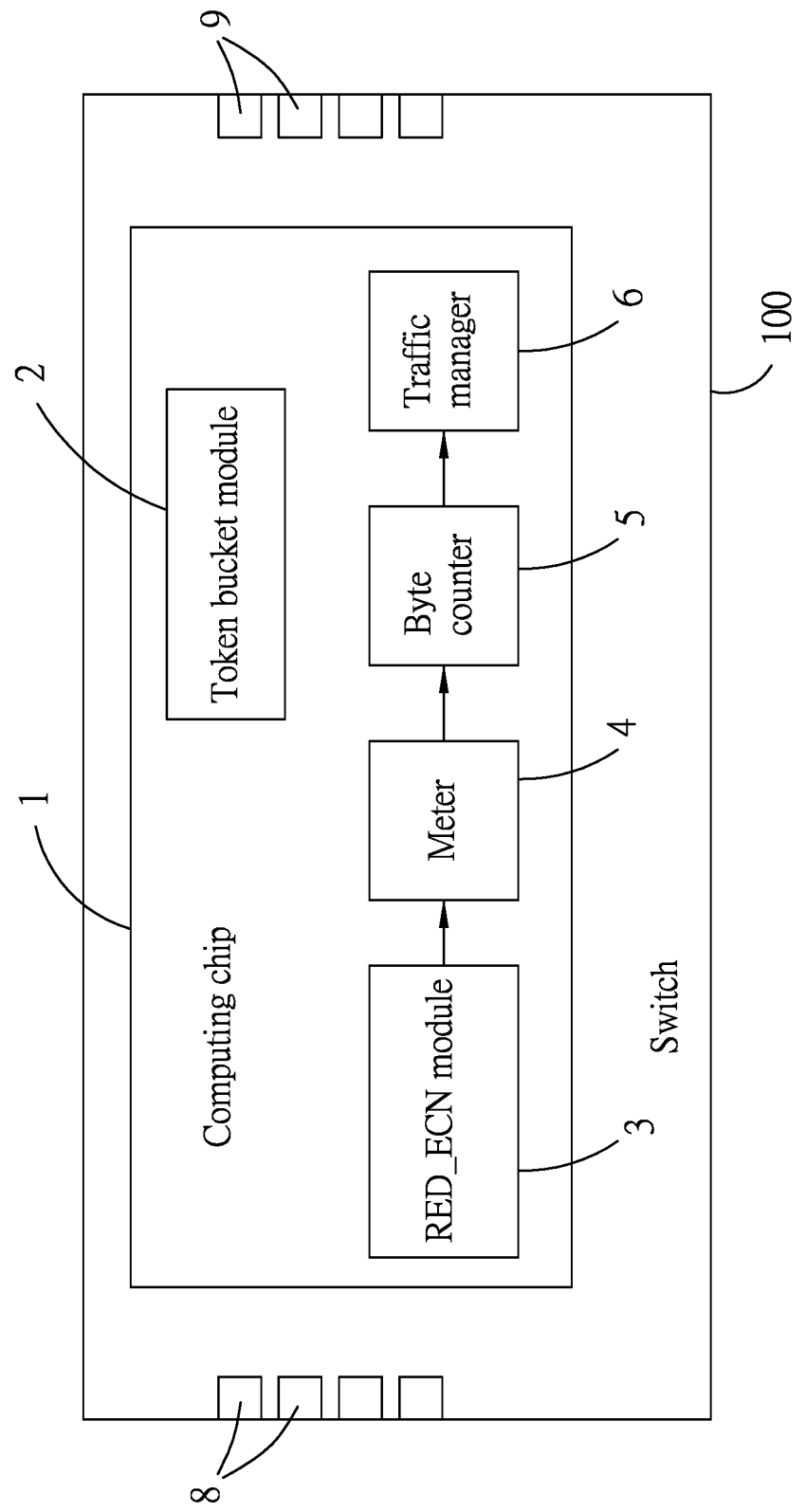
FIG. 1 is a schematic diagram illustrating an embodiment of a switch utilized to implement a method for regulating traffic of a Transmission Control Protocol (TCP) flow according to the disclosure.

FIG. 1 illustrates an embodiment of a switch 100 that is utilized to implement a method for regulating traffic of a Transmission Control Protocol (TCP) flow according to the disclosure.

The switch 100 includes a computing chip 1, a plurality of input ports 8 and a plurality of output ports 9. The computing chip 1 is configured to process TCP packets that are received via the input ports 8, and to transfer the TCP packets to destinations via the output ports 9.

In this embodiment, the input ports 8 are designated to serve as at least one ingress port, and the output ports 9 are designated to serve as at least one egress port. For example, the input ports 8 (or the output ports 9) are sixteen in number (only four input ports 8 are shown in FIG. 1), and are designated to serve as four ingress ports (or four egress ports) each of which consists of four input ports 8 (or four output ports 9). The computing chip 1 is configured to receive an incoming TCP packet via one of the ingress ports.

In this embodiment, the computing chip 1 is programmed by using programming protocol-independent packet processor (P4) description language. In other embodiments, the computing chip 1 may be implemented by an application-specific integrated circuit (ASIC) or a field programmable gate array (FPGA). It should be noted that implementation of the computing chip 1 is not limited to the disclosure herein and may vary in other embodiments.

The computing chip 1 includes a token bucket module 2, a random early detection explicit congestion notification (RED_ECN) module 3, a meter 4, a byte counter 5 and a traffic manager 6.

The token bucket module 2 is configured to realize a token bucket which holds tokens. It is worth to note that a bucket size is a capacity of the token bucket for holding tokens (i.e., the largest number of tokens that can be held), and a current bucket level represents a number of the tokens currently held by the token bucket. In this embodiment, the bucket size is 128 kilobytes, and one token allows one byte of data to be transmitted.

The RED_ECN module 3 is configured to decide, based on a ratio of current bucket level to bucket size of the token bucket, a logical value of an Explicit Congestion Notification (ECN) bit of the incoming TCP packet.

The meter 4 is configured to set a field of a meter tag of the incoming TCP packet based on a packet length of the incoming TCP packet, the logical value of the ECN bit of the incoming TCP packet, and the current bucket level of the token bucket. Moreover, the meter 4 is configured to update the current bucket level of the token bucket based on the field of the meter tag of the incoming TCP packet thus set, and to increase, the current bucket level of the token bucket by a preset increment (e.g., 128 bytes) every preset period (e.g., 2048 nanoseconds). In a scenario where the preset period is 2048 nanoseconds and the preset increment is 128 bytes, a rate of change of bucket level of the token bucket will be 62.5 megabytes per second (MB/s), i.e., 500 megabits per second (Mbps).

In one embodiment, the meter tag carried by the incoming TCP packet is implemented by defining metadata related to the meter 4 in the P4 description language used to program the computing chip 1.

The byte counter 5 is configured to calculate an actual transmission rate at which the incoming TCP packet, the field of the meter tag of which is set to indicate packet forwarding, is to be transmitted. In addition, the byte counter 5 is further configured to calculate a difference between the actual transmission rate and a target rate. The target rate is usually specified by a network service contract.

The traffic manager 6 is configured to drop the incoming TCP packet the field of the meter tag of which is set to indicate packet dropping.

It should be noted that the token bucket module 2, the RED_ECN module 3, the meter 4, the byte counter 5 and the traffic manager 6 may individually be implemented by one of hardware, firmware, software, and any combination thereof. For example, the token bucket module 2, the RED_ECN module 3, the meter 4, the byte counter 5 and the traffic manager 6 may be implemented to be software modules in a program, where the software modules contain codes and instructions to carry out specific functionalities, and can be called individually or together to perform operations of the computing chip 1 of this disclosure.

Figure 2A:
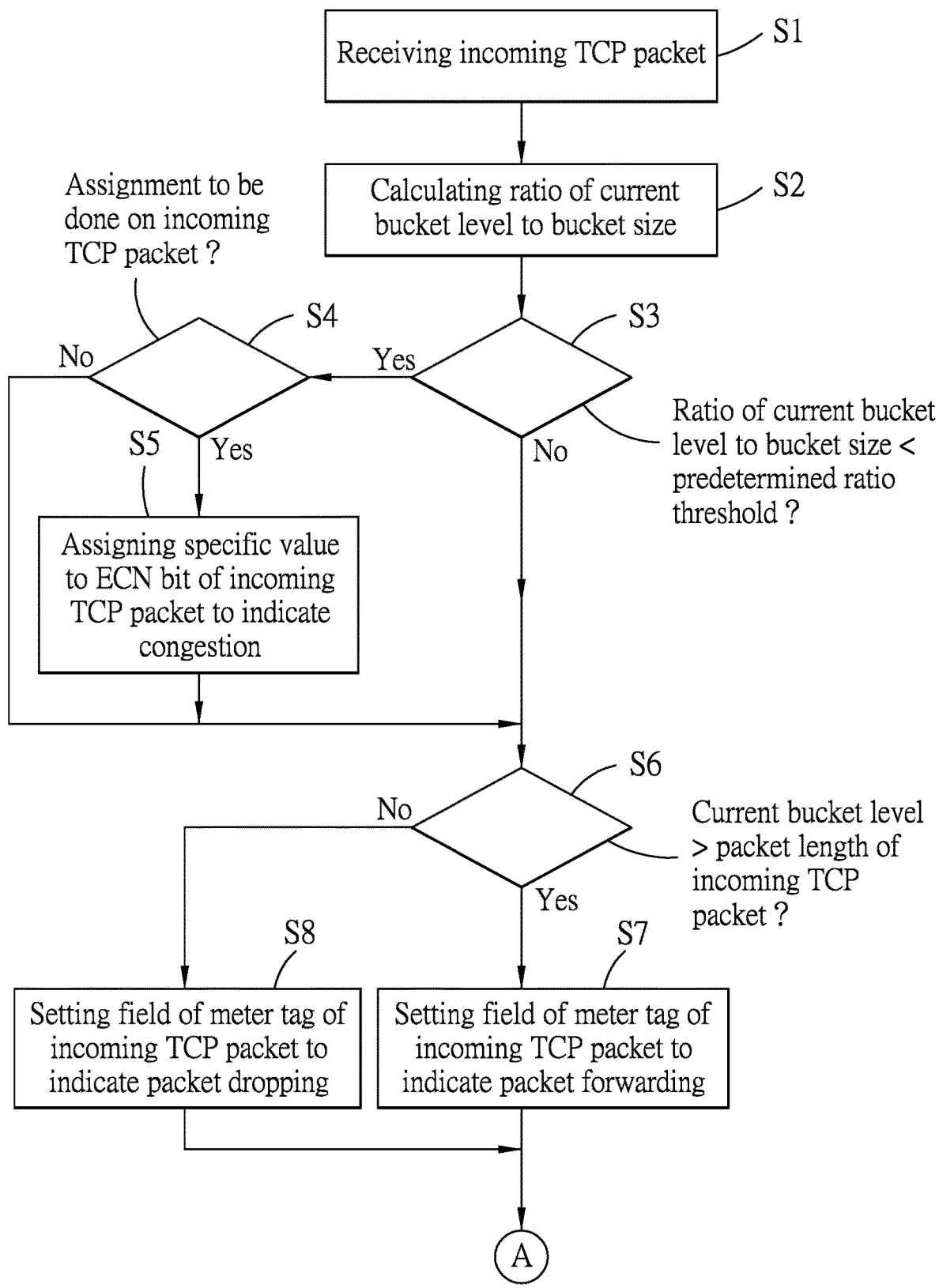
FIGS. 2A, 2B and 3 are flow charts cooperatively illustrating the method for regulating traffic of a TCP flow according to the disclosure.
Figure 2B:
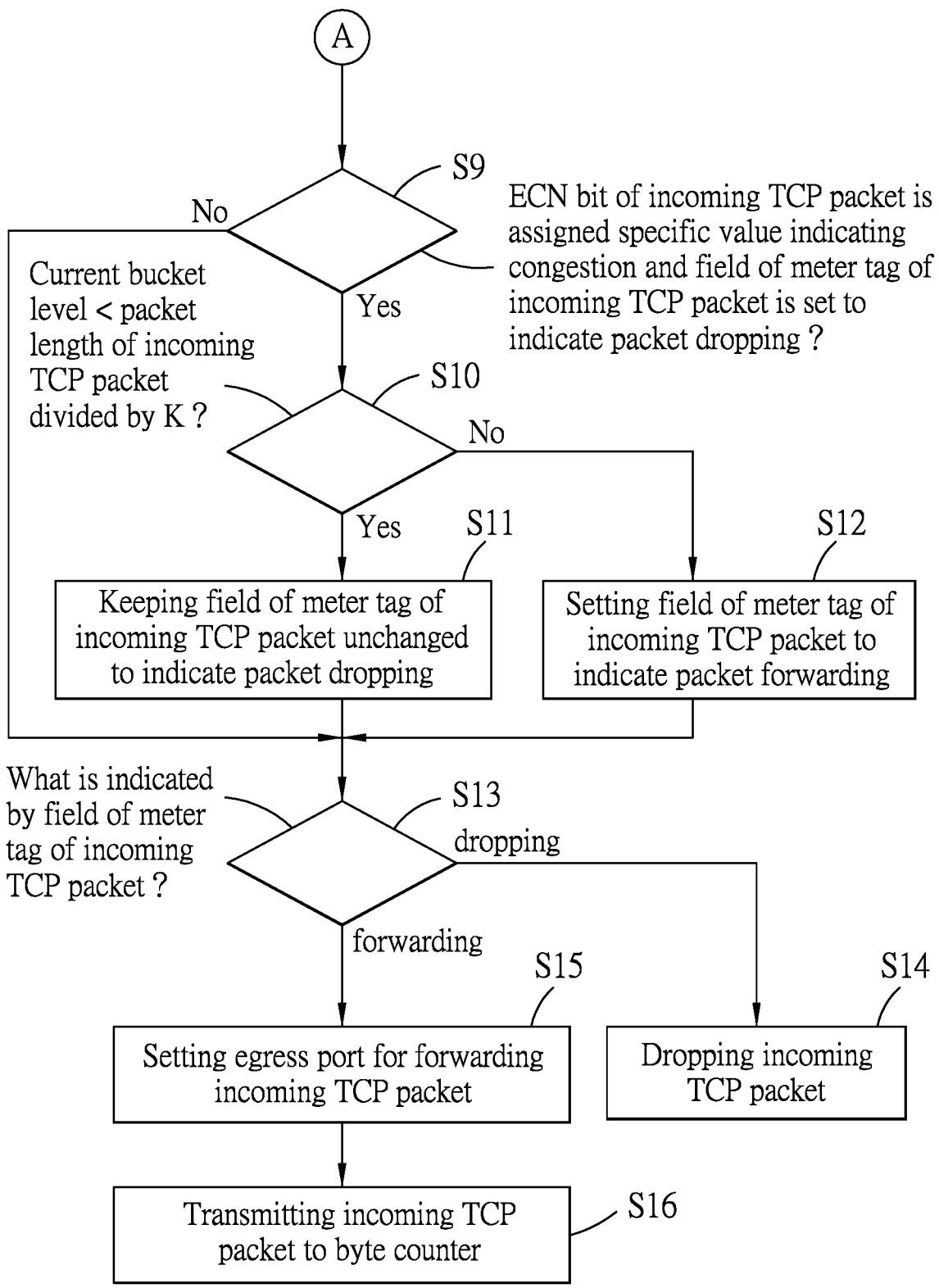

Referring to FIGS. 1, 2A and 2B, an embodiment of the method for regulating traffic of a TOP flow according to the disclosure is illustrated. The method includes steps S1 to S17 delineated below.

In step S1, the computing chip 1 receives an incoming TOP packet via one of the ingress ports.

In step S2, the RED_ECN module 3 calculates the ratio of current bucket level to bucket size by dividing the current bucket level by the bucket size of the token bucket.

In step S3, the RED_ECN module 3 determines whether the ratio of current bucket level to bucket size is smaller than a predetermined ratio threshold. When it is determined that the ratio of current bucket level to bucket size is smaller than the predetermined ratio threshold, a procedure flow of the method proceeds to step S4. On the other hand, when it is determined that the ratio of current bucket level to bucket size is not smaller than the predetermined ratio threshold, the procedure flow proceeds to step S6.

In step S4, the RED_ECN module 3 determines whether or not to assign a specific value to the ECN bit of the incoming packet to indicate congestion, wherein the determination is made by random with a predetermined probability for a determination result in the positive or negative. The specific value indicating congestion is three in this embodiment, but is not limited thereto. When it is determined to assign the specific value to the ECN bit of the incoming TCP packet to indicate congestion, the procedure flow proceeds to step S5. Otherwise, the procedure flow proceeds to step S6. The predetermined probability is exemplarily 20% in this embodiment, but is not limited thereto.

In step S5, the RED_ECN module 3 assigns the specific value to the ECN bit of the incoming TCP packet to indicate congestion.

It is worth to note that when it is determined that the ratio of current bucket level to bucket size is not smaller than the predetermined ratio threshold, or when it is determined that the ratio of current bucket level to bucket size is smaller than the predetermined ratio threshold and it is determined not to perform the assignment on the incoming TCP packet, the ECN bit of the incoming TCP packet is kept at a default value indicating non-congestion, where the default value is not equal to three.

In step S6, the meter 4 determines whether the current bucket level is greater than the packet length of the incoming TCP packet. When it is determined that the current bucket level is greater than the packet length of the incoming TCP packet, the procedure flow proceeds to step S7. Oppositely, when it is determined that the current bucket level is not greater than the packet length of the incoming TCP packet, the procedure flow proceeds to step S8.

In step S1, the meter 4 sets the field of the meter tag of the incoming TCP packet to indicate packet forwarding. For example, the meter 4 sets the field of the meter tag to a color "green" so as to indicate packet forwarding. Then, the procedure flow proceeds to step S9.

In step S8, the meter 4 sets the field of the meter tag of the incoming TCP packet to indicate packet dropping. For example, the meter 4 sets the field of the meter tag to a color "red" so as to indicate packet dropping. Then, the procedure flow proceeds to step S9.

In step S9, the meter 4 determines whether the ECN bit of the incoming TCP packet is assigned the specific value indicating congestion while the field of the meter tag of the incoming TCP packet is set to indicate packet dropping. When it is determined that the ECN bit of the incoming TCP packet is assigned the specific value indicating congestion and that the field of the meter tag of the incoming TCP packet is set to indicate packet dropping, the procedure flow proceeds to step S10. Otherwise, the procedure flow proceeds to step S13.

In step S10, the meter 4 determines whether the current bucket level is smaller than the packet length of the incoming TCP packet divided by K, where K is a positive integer. K is equal to two in this embodiment, but is not limited thereto in other embodiments. When it is determined that the current bucket level is smaller than the packet length of the incoming TCP packet divided by K, the procedure flow proceeds to step S11. Otherwise, when it is determined that the current bucket level is not smaller than the packet length of the incoming TCP packet divided by K, the procedure flow proceeds to step S12.

In step S11, the meter 4 keeps the field of the meter tag of the incoming TCP packet unchanged to indicate packet dropping. Then, the procedure flow proceeds to step S13.

In step S12, the meter 4 sets the field of the meter tag of the incoming TCP packet to indicate packet forwarding (e.g., changing from red to green). Then, the procedure flow proceeds to step S13.

In step S13, the meter 4 determines what the field of the meter tag of the incoming TCP packet indicates. When it is determined that the field of the meter tag of the incoming TCP packet indicates packet dropping, i.e., the field of the meter tag is set to the color "red", the procedure flow proceeds to step S14. On the other hand, when it is determined that the field of the meter tag of the incoming TCP packet indicates packet forwarding, i.e., the field of the meter tag is set to the color "green", the procedure flow proceeds to step S15.

In step S14, the traffic manager 6 drops the incoming TCP packet.

In step S15, the computing chip 1 sets one of the egress ports for forwarding the incoming TCP packet. Next, the procedure flow proceeds to step S16.

In step S16, the meter 4 transmits the incoming TCP packet to the byte counter 5.

Figure 3:
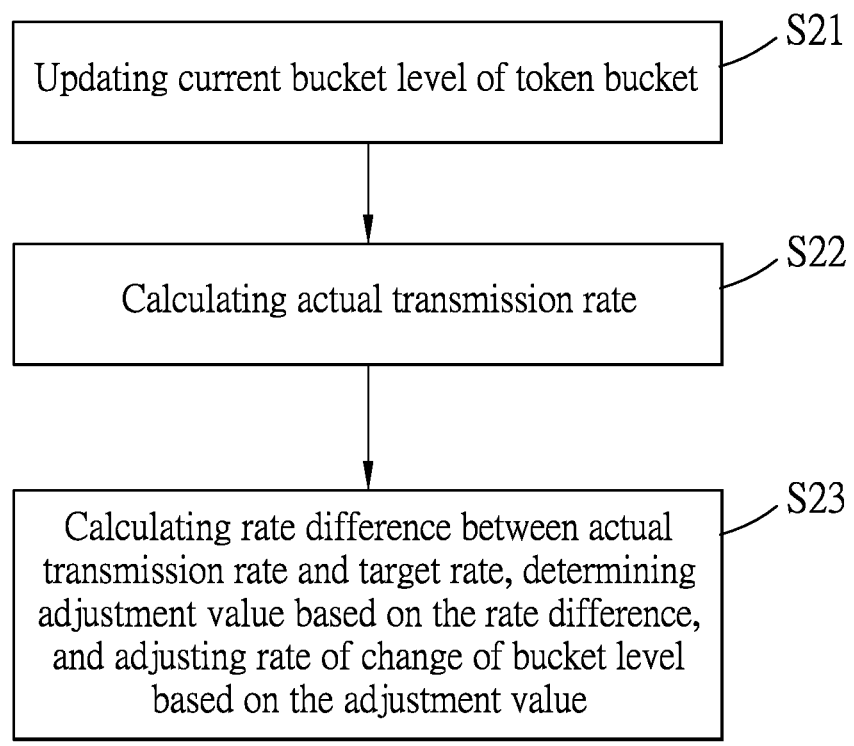

Referring to FIGS. 1 and 3, the embodiment of the method according to the disclosure further includes steps S21 to S23 delineated below.

In step S21, the meter 4 updates the current bucket level of the token bucket based on the field of the meter tag of the incoming TCP packet, and increases the current bucket level of the token bucket by the preset increment every preset period.

Specifically speaking, when it is determined that the field of the meter tag of the incoming TCP packet indicates packet forwarding, the meter 4 subtracts the packet length of the incoming TCP packet from the current bucket level. It should be noted that the minimum of the current bucket level is zero, and the maximum of the current bucket level is the bucket size.

In step S22, the byte counter 5 calculates the actual transmission rate at which the incoming TCP packet, the field of the meter tag of which is set to indicate packet forwarding, is to be transmitted. In other words, the byte counter 5 calculates how many bytes of data is to be transmitted per second. In practice, information kept by the byte counter 5 is read and cleared every predetermined period (e.g., one second).

In step S23, the byte counter 5 calculates the difference between the actual transmission rate and the target rate (referred to as a rate difference hereinafter) by subtracting the actual transmission rate from the target rate. Subsequently, the computing chip 1 determines, based on the rate difference, an adjustment value for the rate of change of bucket level, and adjusts the rate of change of bucket level based on the adjustment value such that the actual transmission rate approaches the target rate.

Specifically speaking, the switch 100 calculates the rate difference by subtracting the actual transmission rate from the target rate, and determines the adjustment value for the rate of change of bucket level by using a proportional-integral-derivative (PID) control algorithm based on the rate difference thus calculated.

Since implementation of the PID control algorithm is known to one skilled in the relevant art, detailed explanation of the same is omitted herein for the sake of brevity. In brief, a mathematical formula of the PID control algorithm can be expressed as:

$$u(t) = K_p \cdot e(t) + K_i \cdot \int_0^t e(\tau)d\tau + K_d \cdot \frac{de(t)}{dt}$$

where u(t) represents the adjustment value, both e(t) and e(τ) represent the rate difference, and coefficients $K_p$, $K_i$ and $K_d$ respectively denote a proportional gain, an integral gain and a derivative gain. The coefficients $K_p$, $K_i$ and $K_d$ may respectively have values of 0.7, 0.15 and 0, but are not limited thereto.

In a scenario where the preset period is denoted by T(t), the preset increment is denoted by N(t), and the target rate is denoted by R, the preset period T(t) can be formulated as $$T(t) = \frac{N(t)}{R + u(t)} \text{ or } T(t) = \frac{N}{R + u(t)}$$

for a constant preset increment N. In another aspect, the preset increment N(t) can be formulated as N(t)=T(t)×(R+u(t)), or N(t)=T×(R+u(t)) for a constant preset period T.

The computing chip 1 determines whether the rate difference thus calculated is either greater than zero or smaller than zero. In order to make the rate difference thus calculated approach zero, the computing chip 1 increases the rate of change of bucket level (i.e., R+u(t)) when it is determined that the rate difference thus calculated is greater than zero. On the other hand, the computing chip 1 decreases the rate of change of bucket level when it is determined that the rate difference thus calculated is smaller than zero.

In one embodiment where the preset increment is constant, the computing chip 1 increases the rate of change of bucket level by reducing the preset period (i.e., T(t)) when it is determined that the rate difference thus calculated is greater than zero, and decreases the rate of change of bucket level by extending the preset period when it is determined that the rate difference thus calculated is smaller than zero.

In one embodiment where the preset period is constant, the computing chip 1 increases the rate of change of bucket level by increasing the preset increment (i.e., N(t)) when it is determined that the rate difference thus calculated is greater than zero, and decreases the rate of change of bucket level by decreasing the preset increment when it is determined that the rate difference thus calculated is smaller than zero.

Conventionally, a transmission rate for a TCP flow can merely reach about 10% of the target rate, which is specified by the network service contract. However, by using the method according to the disclosure, the actual transmission rate is able to reach 95% of the target rate, remarkably upgrading efficiency of network transmission. That is to say, the scheme adopted by the meter 4 of the switch 100 according to the disclosure is TCP-friendly.

To sum up, the method for regulating traffic of a TCP flow according to the disclosure utilizes the switch 100 to decide the value of the ECN bit of a TCP packet based on the ratio of current bucket level to bucket size, and to set the field of the meter tag of the TCP packet based on the packet length of the TCP packet, the value of the ECN bit, and the current bucket level. Further, the switch 100 is able to update the current bucket level based on the field of the meter tag, to calculate the actual transmission rate, and to adjust the rate of change of bucket level based on the difference between the actual transmission rate and the target rate (i.e., the rate difference) such that the actual transmission rate approaches the target rate. In this way, a TCP-friendly scheme of congestion control is realized in the meter 4 of the switch 100.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for regulating traffic of a Transmission Control Protocol (TCP) flow, to be implemented by a switch, said method comprising:
    a) receiving an incoming TCP packet;
    b) deciding, based on a ratio of current bucket level to bucket size of a token bucket, a logical value of an Explicit Congestion Notification (ECN) bit of the incoming TCP packet;
    c) setting a field of a meter tag of the incoming TCP packet to indicate one of packet forwarding and packet dropping based on a packet length of the incoming TCP packet, the logical value of the ECN bit of the incoming TCP packet, and a current bucket level of the token bucket;
    d) updating the current bucket level of the token bucket based on the field of the meter tag of the incoming TCP packet thus set, and increasing the current bucket level of the token bucket by a preset increment every preset period;
    e) calculating an actual transmission rate at which the incoming TCP packet, the field of the meter tag of which is set to indicate packet forwarding, is to be transmitted; and
    f) determining, based on a difference between the actual transmission rate and a target rate, an adjustment value for a rate of change of bucket level, and adjusting the rate of change of bucket level based on the adjustment value such that the actual transmission rate approaches the target rate,
    wherein step b) includes:
    calculating the ratio of current bucket level to bucket size by dividing the current bucket level by a bucket size of the token bucket, where the bucket size is a capacity of the token bucket for holding tokens, and the current bucket level represents a number of the tokens currently held by the token bucket;
    determining whether the ratio of current bucket level to bucket size is smaller than a predetermined ratio threshold;
    when it is determined that the ratio of current bucket level to bucket size is smaller than the predetermined ratio threshold, determining whether or not to assign a specific value to the ECN bit of the incoming TCP packet to indicate congestion, where the determination is made by random with a predetermined probability for a determination result in the positive or negative; and
    when it is determined that the ratio of current bucket level to bucket size is not smaller than the predetermined ratio threshold, or when it is determined that the ratio of current bucket level to bucket size is smaller than the predetermined ratio threshold and to not assign the specific value to the ECN bit of the incoming TCP packet, keeping the ECN bit of the incoming TCP packet at a default value to indicate non-congestion.

2. The method as claimed in claim 1, wherein step c) includes:
    determining whether the current bucket level is greater than the packet length of the incoming TCP packet;
    when it is determined that the current bucket level is greater than the packet length of the incoming TCP packet, setting the field of the meter tag of the incoming TCP packet to indicate packet forwarding;
    when it is determined that the current bucket level is not greater than the packet length of the incoming TCP packet, setting the field of the meter tag of the incoming TCP packet to indicate packet dropping;
    determining whether the ECN bit of the incoming TCP packet is assigned the specific value indicating congestion and whether the field of the meter tag of the incoming TCP packet is set to indicate packet dropping;
    when it is determined that the ECN bit of the incoming TCP packet is assigned the specific value indicating congestion and that the field of the meter tag of the incoming TCP packet is set to indicate packet dropping, determining whether the current bucket level is smaller than the packet length of the incoming TCP packet divided by K, where K is a positive integer;
    when it is determined that the current bucket level is not smaller than the packet length of the incoming TCP packet divided by K, setting the field of the meter tag of the incoming TCP packet to indicate packet forwarding; and
    when it is determined that the current bucket level is smaller than the packet length of the incoming TCP packet divided by K, keeping the field of the meter tag of the incoming TCP packet unchanged to indicate packet dropping.

3. The method as claimed in claim 2, wherein K is equal to two.

4. The method as claimed in claim 1, wherein one token allows one byte of data to be transmitted.

5. The method as claimed in claim 1, wherein step d) includes:
    determining what the field of the meter tag of the incoming TCP packet indicates; and
    when it is determined that the field of the meter tag of the incoming TCP packet indicates packet forwarding, subtracting the packet length of the incoming TCP packet from the current bucket level to update the current bucket level.

6. The method as claimed in claim 1, wherein step f) includes:
    calculating the difference between the actual transmission rate and the target rate by subtracting the actual transmission rate from the target rate, and determining whether the difference between the actual transmission rate and the target rate thus calculated is either greater than zero or smaller than zero;
    increasing the rate of change of bucket level when it is determined that the difference between the actual transmission rate and the target rate thus calculated is greater than zero; and decreasing the rate of change of bucket level when it is determined that the difference between the actual transmission rate and the target rate thus calculated is smaller than zero.

7. The method as claimed in claim 6, wherein step f) further includes:
increasing the rate of change of bucket level by reducing the preset period when it is determined that the difference between the actual transmission rate and the target rate thus calculated is greater than zero; and
decreasing the rate of change of bucket level by extending the preset period when it is determined that the difference between the actual transmission rate and the target rate thus calculated is smaller than zero.

8. The method as claimed in claim 1, wherein step f) includes:
calculating the difference between the actual transmission rate and the target rate by subtracting the actual transmission rate from the target rate; and
determining the adjustment value for the rate of change of bucket level by using a proportional—integral—derivative (PID) control algorithm based on the difference between the actual transmission rate and the target rate thus calculated.

9. A method for regulating traffic of a Transmission Control Protocol (TCP) flow, to be implemented by a switch, said method comprising:
a) receiving an incoming TCP packet;
b) deciding, based on a ratio of current bucket level to bucket size of a token bucket, a logical value of an Explicit Congestion Notification (ECN) bit of the incoming TCP packet;
c) setting a field of a meter tag of the incoming TCP packet to indicate one of packet forwarding and packet dropping based on a packet length of the incoming TCP packet, the logical value of the ECN bit of the incoming TCP packet, and a current bucket level of the token bucket;
d) updating the current bucket level of the token bucket based on the field of the meter tag of the incoming TCP packet thus set, and increasing the current bucket level of the token bucket by a preset increment every preset period;
e) calculating an actual transmission rate at which the incoming TCP packet, the field of the meter tag of which is set to indicate packet forwarding, is to be transmitted; and
f) determining, based on a difference between the actual transmission rate and a target rate, an adjustment value for a rate of change of bucket level, and adjusting the rate of change of bucket level based on the adjustment value such that the actual transmission rate approaches the target rate,
wherein step f) includes:
calculating the difference between the actual transmission rate and the target rate by subtracting the actual transmission rate from the target rate, and determining whether the difference between the actual transmission rate and the target rate thus calculated is either greater than zero or smaller than zero;
increasing the rate of change of bucket level when it is determined that the difference between the actual transmission rate and the target rate thus calculated is greater than zero; and
decreasing the rate of change of bucket level when it is determined that the difference between the actual transmission rate and the target rate thus calculated is smaller than zero.

* * * * *